United States Patent
Adams et al.

(10) Patent No.: US 9,813,100 B1
(45) Date of Patent: Nov. 7, 2017

(54) PRIVACY ENHANCING DEVICE CASE

(71) Applicant: BlackBerry Limited, Waterloo (CA)

(72) Inventors: Neil Patrick Adams, Waterloo (CA); Yi Ying Wang, Vancouver (CA); Younghwan Kim, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/247,667

(22) Filed: Aug. 25, 2016

(51) Int. Cl.
*H04M 1/00* (2006.01)
*H04B 1/38* (2015.01)
*H04B 1/3888* (2015.01)
*H04N 5/225* (2006.01)

(52) U.S. Cl.
CPC ........... *H04B 1/3888* (2013.01); *H04N 5/225* (2013.01)

(58) Field of Classification Search
CPC .................................................. H04B 1/3888
USPC ...................................................... 455/575.8
See application file for complete search history.

(56) References Cited

U.S. PATENT DOCUMENTS

| 7,706,837 B2 | 4/2010 | Ladouceur | |
|---|---|---|---|
| 8,295,897 B2 | 10/2012 | Griffin | |
| 8,764,319 B2 | 7/2014 | Oh et al. | |
| 2004/0233173 A1* | 11/2004 | Bryant | G06F 3/0202 345/169 |
| 2004/0253330 A1* | 12/2004 | Miketin | A61K 36/185 424/764 |
| 2009/0181729 A1* | 7/2009 | Griffin, Jr. | H04N 5/2254 455/575.1 |
| 2011/0195761 A1 | 8/2011 | Lee | |
| 2015/0229746 A1* | 8/2015 | Bergin | H04M 1/185 455/556.1 |
| 2015/0311941 A1* | 10/2015 | Sorrentino | H04M 1/185 455/575.8 |
| 2016/0049979 A1 | 2/2016 | Grouwstra | |
| 2016/0205326 A1 | 7/2016 | Laroia | |

OTHER PUBLICATIONS

Eyepatch Case, "EyePatch Phone Cases for Camera Protection and Privacy—EyePatch Case", Aug. 1, 2015, downloaded from Internet Archive Wayback Machine, https://web.archive.org/web/20150801062827/http://eyepatchcase.com, pp. 1-3.
Cam Defender Inc., https://www.facebook.com/CamDefender/photos/a.497402033775284.1073741828.486728648175956/498666980315456/?type=3&theater, Jan. 29, 2016, p. 1.

* cited by examiner

*Primary Examiner* — Tilahun B Gesesse
(74) *Attorney, Agent, or Firm* — Jeffrey N. Giunta; Fleit Gibbons Gutman Bongini & Bianco P.L.

(57) ABSTRACT

A device case has a body forming a compartment holding an electronic device with a back facing camera lens and a front side with a user interface display and front facing camera lens. The device case has a movable lens cover attached to the body and held by the body when moved to any of an open position, a first position, and a second position. The movable lens cover, in the open position, leaves the front facing camera lens, the user interface display, and the back facing camera lens exposed. The movable lens cover, in the first position, covers the back facing camera lens while leaving the user interface display and the front facing camera lens exposed, and when in the second position, covers both the front facing camera lens and the back facing camera lens while leaving the user interface display exposed.

18 Claims, 6 Drawing Sheets

PRIVACY ENHANCING DEVICE CASE

FIELD OF THE DISCLOSURE

The present disclosure generally relates to cases for electronic devices, and more particularly to cases that selectably obstruct operations of multiple cameras of those electronic devices.

BACKGROUND

Many types of portable electronic devices include image capturing components, such as cameras, that are able to capture images, videos, other visual impressions, or combinations of these. In general, the operation of such image capturing components is able to be controlled by a user of the electronic device. Privacy and security of a user of the electronic device is able to be enhanced by preventing images to be captured by the image capturing components of an electronic device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described device covers and methods operate to enhance a user's privacy when using a device that has a number of cameras. In an example, an electronic device has two cameras. In such an example, one camera has a front facing camera lens and another camera has a back facing camera lens. A front side of the electronic device in an example has the front facing camera lens and that front side also has a user interface display. The back facing camera lens in an example is on a back side of the electronic device, where the back side is opposite the front side. In one example, an electronic device for which a device case can be used is a smartphone or other data communications device that has two cameras and a user interface display used to, for example, control or interact with the operation of the smartphone.

Some of the device covers described below are used with a smartphone that has one or more back facing camera lenses to capture images in the direction of the back of the camera and a front facing camera lens to capture images in the direction of the front of the camera. Some of these smartphones further have a user interface display that supports displaying images, such as images displayed as part of a video chat. As is understood, a video chat is able to be conducted in an example using a smartphone that has a front facing camera by the user looking at the front side of the smartphone so the user can seen images of the other person in the video chat on the user interface display while looking into the front facing camera. In further examples, video chatting is able to also include images or videos captured by camera lenses facing other directions, such as videos captured by a back facing camera lens in order to show the environment of the person participating in the video call.

In some examples, these device cases are designed to hold a smartphone that has a front facing camera lens and one or more back facing camera lenses that are each located at or near particular locations on the body of the smartphone. Although some of the following examples include a smartphone that has one back facing camera lens, it is clear that the principles described below can be readily applied to a device case that holds a smartphone or other electronic device that has two or more back facing cameras. Such a device case would have a movable lens cover that would cover one or both of those back facing camera lenses while selectably either covering or leaving exposed the front facing camera lens. In some examples, a user interface display is also located on the same side of these smartphones as the front facing camera lens. Cases for these smartphones are designed to have openings to expose various external components of the smartphone, such as the camera lenses and user interface displays.

In some examples, a movable lens cover is movably attached to a device case that is described below so that it is movable between several positions. The movable lens cover in some examples is able to be placed into any one of three positions. In some examples, the movable lens cover never covers or obscures the user interface display of the smartphone in any of these three positions. In other words, the movable lens cover leaves the user interface display exposed in all three of these positions. In further examples, the movable lens cover is able to be moved to additional positions that may cover part or all of the user interface display. Although the movable lens cover in some examples may never cover the user interface display, device cases in some examples have other covers or components that are able to cover the various external elements of the electronic device in the device case. The movable lens cover in some examples is able to be moved to different positions where: 1) an open position leaves both camera lenses exposed; 2) a first position covers only one camera lens and leaves the other camera lens exposed; and 3) a second position that covers both cameras lenses.

In an example, the movable lens cover includes a multiple portion panel that is mounted to the back of the device case by a hinge. This multiple portion panel in an example includes one panel that swings into a position that covers the one or more back facing camera lenses. Once in this position, another portion of the multiple portion panel is able to fold over a side of the smartphone to extend over and cover the front facing camera lens while leaving exposed the user interface display of the smartphone. In various examples, the portion of the movable lens cover that extends over to and covers the front facing camera has openings that correspond to positions of various other devices on the front side of the smartphone, such as a light sensor, earpiece speaker, other components other than image capturing components, or combinations of these. In various examples, the portions of the multiple portion panel are held into various positions by any suitable techniques, such as by magnets or by yieldable members such as pins, elastically deformable protrusions, other features, or combinations of these.

In another example, the movable lens cover includes an articulating panel that is attached to a track that is part of the device case. This articulating panel in an example slides along the track to a retracted position that leaves both camera lenses exposed. From that retracted, or open, position, the articulating panel is able to move along the track to a first position where part of the articulating panel covers the back facing camera lens while leaving the front facing camera lens exposed. The articulating panel is then able to further move past the first position to a second position that allows the articulating panel to also extend over a side of the smartphone and over to a front side of the smartphone to cover the front facing camera lens of the smartphone. In an example, the articulating panel is able to move to the second position by moving along a track that extends over a part of the case that covers both the side of the smartphone and a portion of the front side of the smartphone that includes the front side camera lens. In an alternative example, the track does not extend over the front side of the smartphone. In such an example, a portion of the articulating panel extends beyond the track and is able to bend over to cover the front facing camera lens. Such portions that extend beyond the track are able to be retained into position covering the front facing camera lens by any technique, such as by magnets, yieldable members such as pins, elastically deformable protrusions, other features, or combinations of these.

Figure 1:
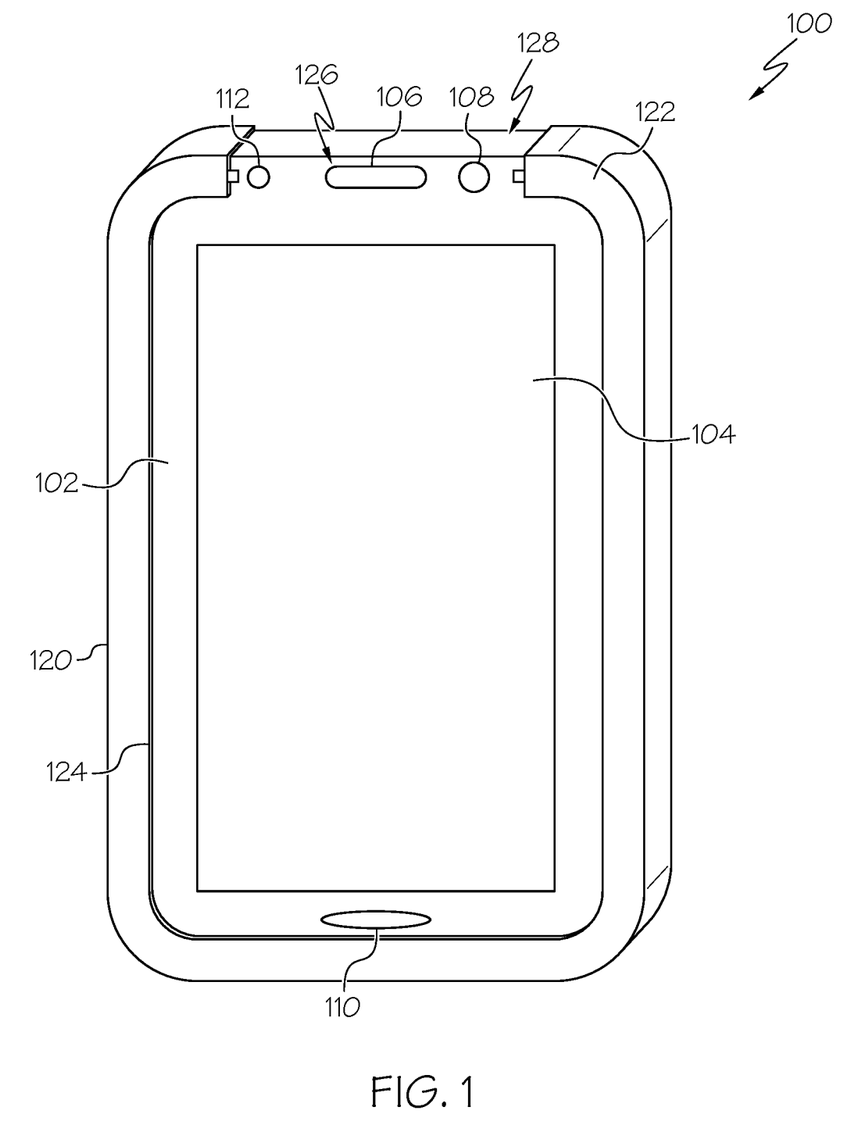
FIG. 1 illustrates a front view of an open privacy cover device case with a smartphone, according to an example.

FIG. 1 illustrates a front view of an open privacy cover device case with a smartphone 100, according to an example. The front view of the open privacy cover device case with a smartphone 100 shows a body 120 of a device cover that is holding a smartphone 102. In the illustrated example, the body 120 forms a compartment that covers at least some of all six sides of the smartphone 102. The body 120 in the illustrated example includes a "lip" 122 that extends to an edge 124 over a portion of the front side of the smartphone 102. The lip 122 forms a front part of the compartment formed by the body 120 that holds the smartphone 102. In further examples, a case is able to have any alternative body design that allows the case to be attached to the smartphone 102 or another electronic device. In general, a body 120 is able to include any such design that configures the body to hold the smartphone 102 or other electronic device.

The smartphone 102 includes a user interface display 104, a microphone 110, an earpiece speaker 106, a front facing camera lens 108, and a light sensor 112. These components are common on smartphones and their operation is understood by practitioners of ordinary skill in the relevant arts. The lip 122 in the illustrated example has a gap 126 that exposes the earpiece speaker 106, front facing camera lens 108, and light sensor 112. The gap 126 allows these components to operate normally when the movable lens cover, described in further detail below, is open and thus leaves these components exposed.

The illustrated body 120 in this example further has a top opening 128 along the top of the smartphone 102 to allow a movable lens cover, as is described in further detail below, to bend over the top of the smartphone 102 and cover the front facing camera lens 108. In further examples, this portion of the body 120 is able to have a grove, other feature or features, or combinations of these, in the vicinity of this location to allow the movable lens cover to bend over the top of the smartphone and cover the front facing camera lens 108.

Figure 2:
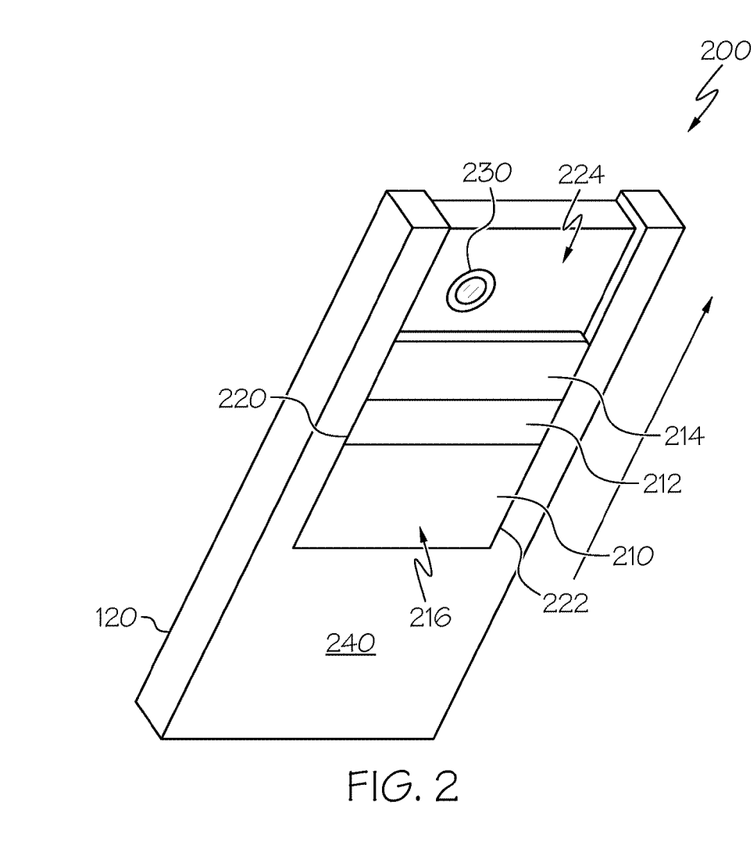
FIG. 2 illustrates a back view of an open articulating privacy cover device case, according to an example.

FIG. 2 illustrates a back view of an open articulating privacy cover device case 200, according to an example. The back view of the open articulating privacy cover device case 200 depicts the back side of an example device case such as the body 120 whose front is depicted in the front view of an open privacy cover device case with a smartphone 100 discussed above. The back view of the open articulating privacy cover device case 200 illustrates a device case body 120 that is holding the smartphone 102. The body 120 has a back side 240 that is adjacent to the back side of the smartphone 102 when the compartment is holding the smartphone 102. In this illustration, a back facing camera lens 230 is shown as being exposed through the back side 240 of the device case body 120.

The open articulating privacy cover device case 200 has a movable lens cover that includes an articulating panel 216 that slides within a track 224. In this illustrated example, the track 224 is formed by a first track edge 220 and a second track edge 222 that are within the back side 240 of the body 120 of the case. The articulating panel 216 in this example is mounted to the back side 240 of the body 120 by being secured within the track 224. The articulating panel 216, which is the moveable lens cover in this example, is in its open position and does not cover either the front facing camera lens 108 or the back facing camera lens 230 of the smartphone.

The back facing camera lens 230 in this illustration is exposed through an opening in the body 120 while the articulating panel is in its open position. In some examples the body 120 does not have material in at least some of the area between the first track edge 220 and the second track edge 222, and thus beneath the track 224. This exposes the back facing camera lens 230 of the smartphone 102 that is within the case. In some examples, a hole is defined by a portion of the case beneath the track 224 to expose the back facing camera lens 230. In further examples, any suitable opening is able to be defined to expose the back facing camera lens 230 through the portion of the case beneath the track 224.

The articulating panel 216 in this example includes a first articulating panel 210, a second articulating panel 212 and a third articulating panel 214. In the back view of the open articulating privacy cover device case 200, the first articulating panel 210, the second articulating panel 212 and the third articulating panel 214 are retracted into the track 224. Because these panels are retracted into the track 224, the articulating panel 216 is in its open position and leaves the back facing camera lens 230, as well as the front facing camera lens 108, exposed.

Figure 3:
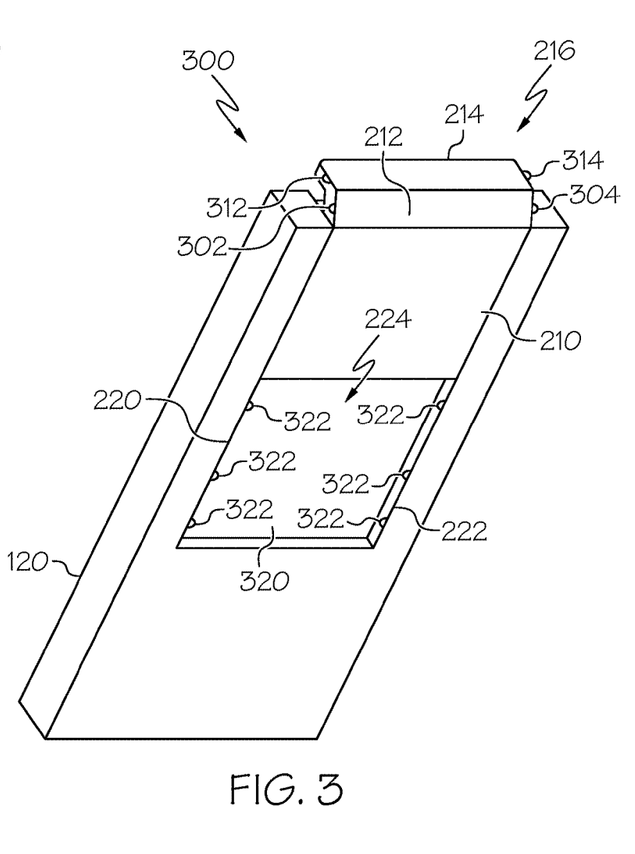
FIG. 3 illustrates a back view of a first position articulating privacy cover device case, according to an example.

FIG. 3 illustrates a back view of a first position articulating privacy cover device case 300, according to an example. The first position articulating privacy cover device case 300 depicts the articulating panel 216 in a first position. In this illustrated example, the articulating panel 216 is able to move along the track 224 into this first position by sliding along the track from the open position that is illustrated in the back view of the open articulating privacy cover device case 200 described above.

In the first position, part of the articulating panel 216 covers the back facing camera lens 230 (as shown in the open articulating cover device case 200). In the first position articulating privacy cover device case 300, the back facing camera lens 230 is not visible because it is covered by part of the articulating panel 216. In further examples, the articulating panel 216 is also able to be in a first position when it is partially retracted into the track 224. For example, the articulating panel is able to be placed into the first position by being moved within the track a short way such that the third articulating panel 214 is covering the back facing camera lens 230. In general, the articulating panel is considered to be in the first position when it is in any position that covers the back facing camera lens 230 and does not cover the front facing camera lens 108 or the user interface display 104.

The illustrated track 224 has a number of protrusions 322 to hold the articulating panel 216 into the track 224. As shown, a number of these protrusions are located on either side of the track and are part of the first track edge 220 and the second track edge 222. In the illustrated example, the part of the track 224 that is exposed when the articulating panel 216 is in its extended position has a track bottom 320 that extends beneath the track 224. In various examples, the track bottom 320 extends over various parts of the bottom of the track 224. In some examples, the track bottom 320 extends up to and includes an opening for a back facing camera lens 230 of the smartphone 102 held in the body of the body 120.

The illustrated first position articulating privacy cover device case 300 depicts the articulating panel 216 being in an extended position. In the illustrated position, the first articulating panel 210 is in the track 224 while the second articulating panel 212 and the third articulating panel 214 extend beyond the track 224 and are able to bend from front to back. The second articulating panel 212 and the third articulating panel 214 in this example form a distal portion of the articulating panel 216. When the articulating panel 216 is extended as is shown, the distal portion that consists of the second articulating panel 212 and the third articulating panel 214 in an example extends beyond the track and can be articulated to cover the front facing camera lens while exposing the user interface display.

The second articulating panel 212 and the third articulating panel 214 that make up the distal portion in this example each have a number of flap protrusions. The second articulating panel 212 has a first flap protrusion 302 and a second flap protrusion 304. The third articulating panel 214 has a third flap protrusion 312 and a fourth flap protrusion 314. As is described below, the flap protrusions engage features on a side of the body 120 and the front of the body 120 to hold portions of the distal portion to the case when the articulating panel 216 is in the second position and covering the front facing camera lens 108. In an example, the flap protrusions are able to slide into recesses in the first track edge 220 and the second track edge 222.

Figure 4:
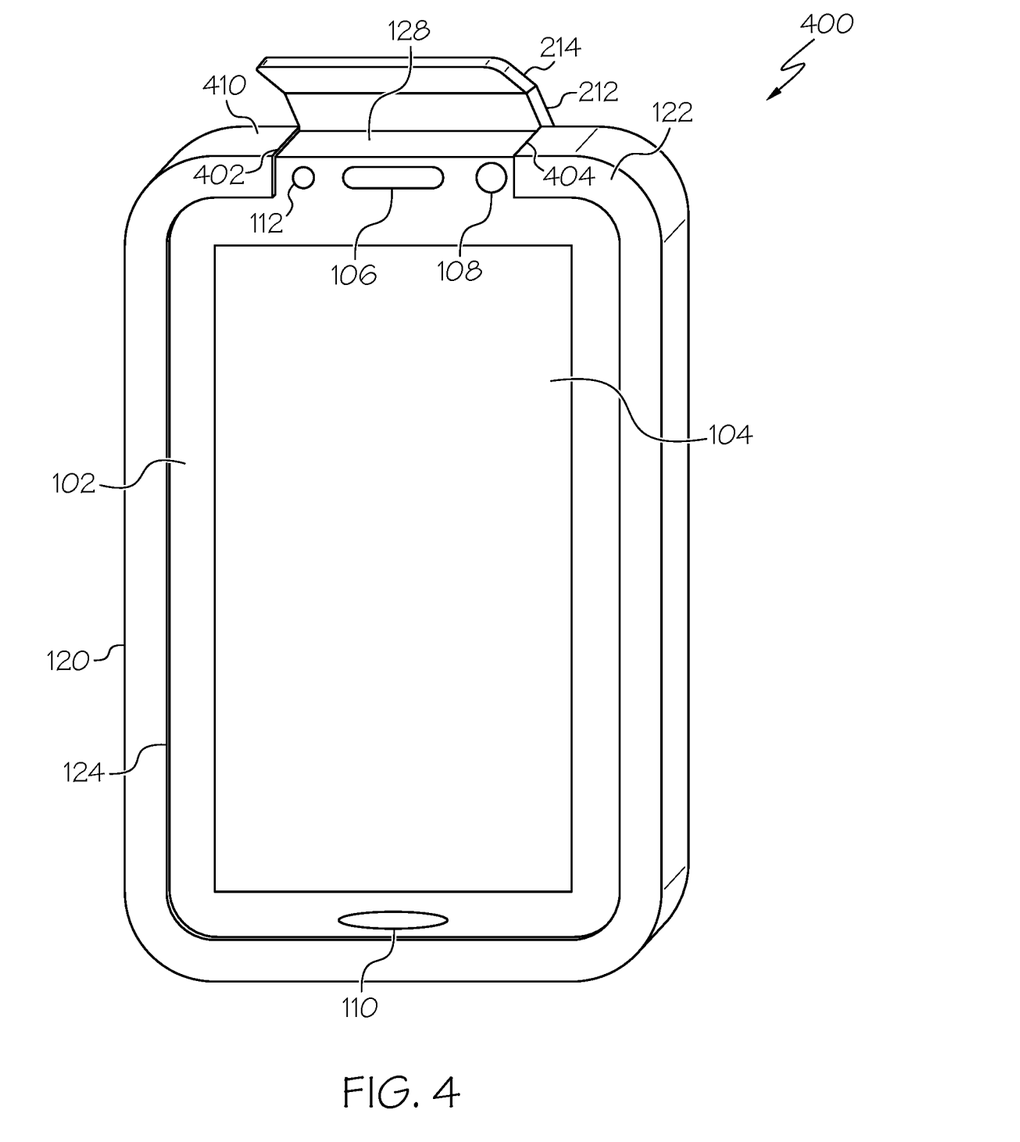
FIG. 4 illustrates a front view of a first position articulating privacy cover device case, according to an example.

FIG. 4 illustrates a front view of a first position articulating privacy cover device case 400, according to an example. The first position articulating privacy cover device case 400 is a view of the front of the body 120 in the same configuration as is depicted in the first position articulating privacy cover device case 300. As described above, the body 120 in this example has a movable lens cover that includes the above described articulating panel 216. The distal portion of the articulating panel 216 in this configuration is depicted with the second articulating panel 212 and the third articulating panel 214 extending above the body 120 but not in a position to cover the front facing camera lens 108. In this configuration, as described above, the first articulating panel 210 covers the back facing camera lens 230 and the distal portion, or any portion, of the articulating panel 216 does not cover the front facing camera lens 108 or the user interface display 104. In this configuration, the articulating panel 216, which is a movable lens cover, is in a first position.

In the illustrated example, the edges of the top opening 128 form a continuation of the track 224. The top opening 128 in this example is a gap within the case top side 410. In such an example, the edges of the top opening 128 has a first top opening track edge 402 and a second top opening track edge 404. In such an example, the distal portion of the articulating panel 216 is able to move along this continuation of the track and be held along the top side of the smartphone 102. In this illustrated example, however, the distal portion of the articulating panel 216 is not engaged in this extension of the track and is free to articulate at points beyond the track 224 along the back side of the body 120. In various examples, the distal portion of the articulating panel 216 is able to be extracted from the continuation of the track 224. In further examples, the distal portion is retained in the extension of the track 224 when the articulating panel is moved to cover the front facing camera lens 108.

In the illustrated example, the body 120 has a case front side, which is the lip 122, that extends over a portion of the front side of the smartphone 102 when it is in held in the case. The lip 122, or case front side, is connected to the back side 240 by the case top side 410. In this example, the track includes a back side track that extends along the back side 240 as is described above. This track further includes a top side track along the edges of the top opening 128 consisting of the first top opening track edge 402 and the second top opening track edge 404, that extends along the case top side 410. In this example the distal portion of the articulating panel can move from a second location that covers the back facing camera lens 230 onto a third location that allows the articulating panel to also cover the front facing camera lens 108, by moving along the top side track and extending beyond the top side track. In an example, a part of the distal portion of the articulating panel 216, such as the third articulating panel 214, is able to be articulated to cover the front facing camera lens 108 while exposing the user interface display 114.

Figure 5:
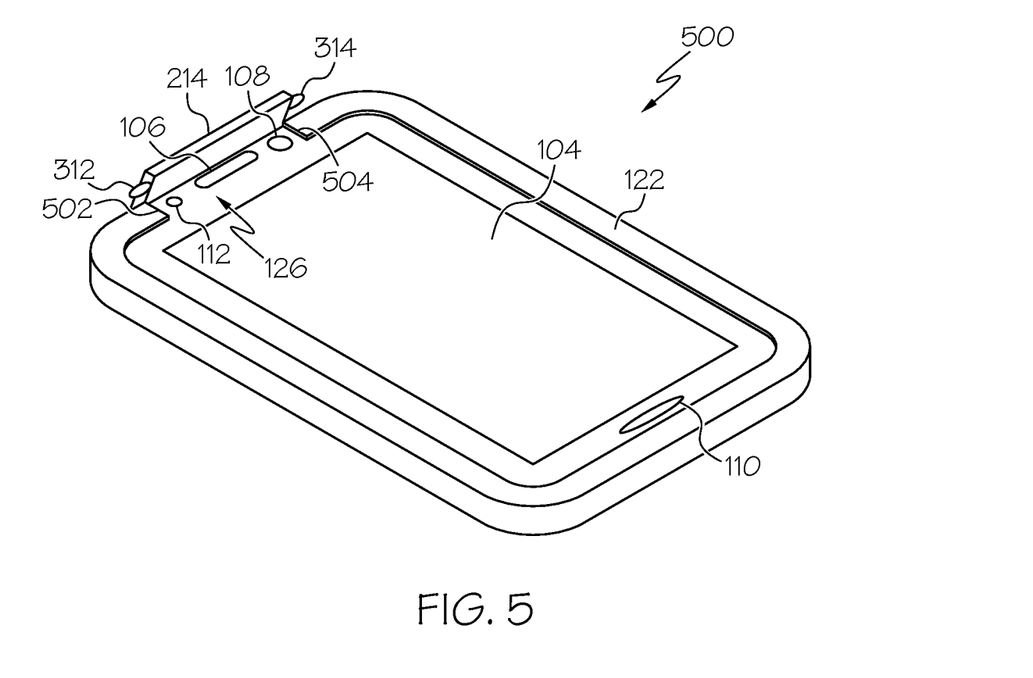
FIG. 5 illustrates a further front view of a first position articulating privacy cover device case, according to an example.

FIG. 5 illustrates a further front view of a first position articulating privacy cover device case 500, according to an example. The further front view of a first position articulating privacy cover device case 500 depicts the device illustrated in the front view of a first position articulating privacy cover device case 400 but the second articulating panel 212 is pressed down into the top opening 128 in the case top side 410 of the body 120. The second articulating panel 212 in this example is held into this position by the first flap protrusion 302 and the second flap protrusion 304 discussed above. The third articulating panel 214 in this configuration is not covering the front facing camera lens 108. In this configuration, the articulating panel 216 is also still in the first position because it covers the back facing camera lens 230 but leaves the front facing camera lens 108 and the user interface display 104 exposed.

Figure 6:
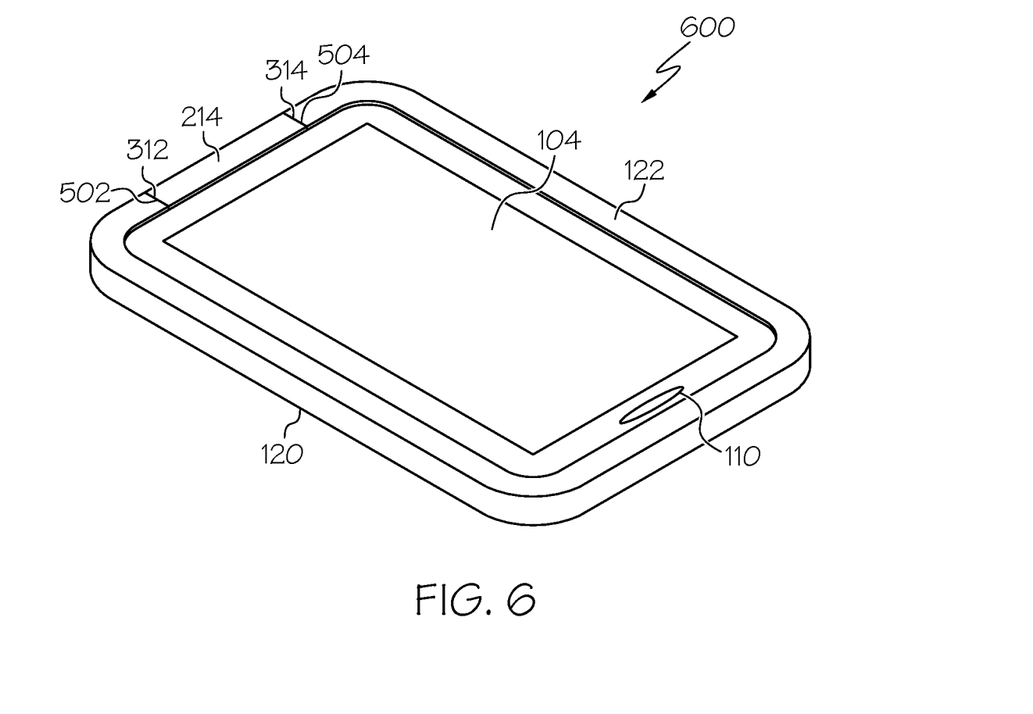
FIG. 6 illustrates a front view of a second position articulating privacy cover device case, according to an example.

The further front view of a first position articulating privacy cover device case 500 depicts the third flap protrusion 312 and the fourth flap protrusion 314 that are on the third articulating panel 214. A first front side recess 502 and a second front side recess 504 are also depicted as being in locations adjacent to the gap 126 of the lip 122 of the case body 120. As described below, the third flap protrusion 312 and the fourth flap protrusion 314 engage the first front side recess 502 and the second front side recess 504 to hold the third articulating panel 214 into position over the front facing camera lens 108 when the articulating panel is in the second position. In an example, one or more of the third flap protrusion 312, the fourth flap protrusion 314, the first front side recess 502, and the second front side recess 504 include yieldable members FIG. 6 illustrates a front view of a second position articulating privacy cover device case 600, according to an example. The front view of a second position articulating privacy cover device case 600 shows the movable lens cover, which is the articulating panel 216 in this example, in the second position where the front facing camera lens 108 and the back facing camera lens 230 are both covered while the user interface display 104 remains exposed.

As described above with regards to the first position articulating privacy cover device case 300, the first articulating panel 210 has slid up on the track 224 to cover the back facing camera lens 230. While the first articulating panel 210 is in that position, the distal portion of the articulating panel 216, which includes the second articulating panel 212 and the third articulating panel 214, is moved to bend over the top of the smartphone and is located in the top opening 128 and gap 126. When the distal portion of the articulating panel is so positioned, the third articulating panel 214 covers the front facing camera lens 108. In various examples, the third articulating panel 214 has perforations or other structures covering the earpiece 106 in order to allow sound to be heard from the earpiece 106 when the movable lens cover is in the second position and the front facing lens 108 is covered.

In the illustrated example, the third flap protrusion 312 and the fourth flap protrusion 314 engage the first front side recess 502 and the second front side recess 504 to hold the third articulating panel 214 into position over the front facing camera lens 108. This is an example of yieldable members retaining a portion of the movable lens cover when the articulating panel is in the second position. In alternative examples, one or more magnets are located in the portions of the articulating panel 214, at locations on the case body 120, or in combinations of these, to retain at least a portion of the articulating lens cover in the second position and covering the front facing camera lens 108.

Figure 7:
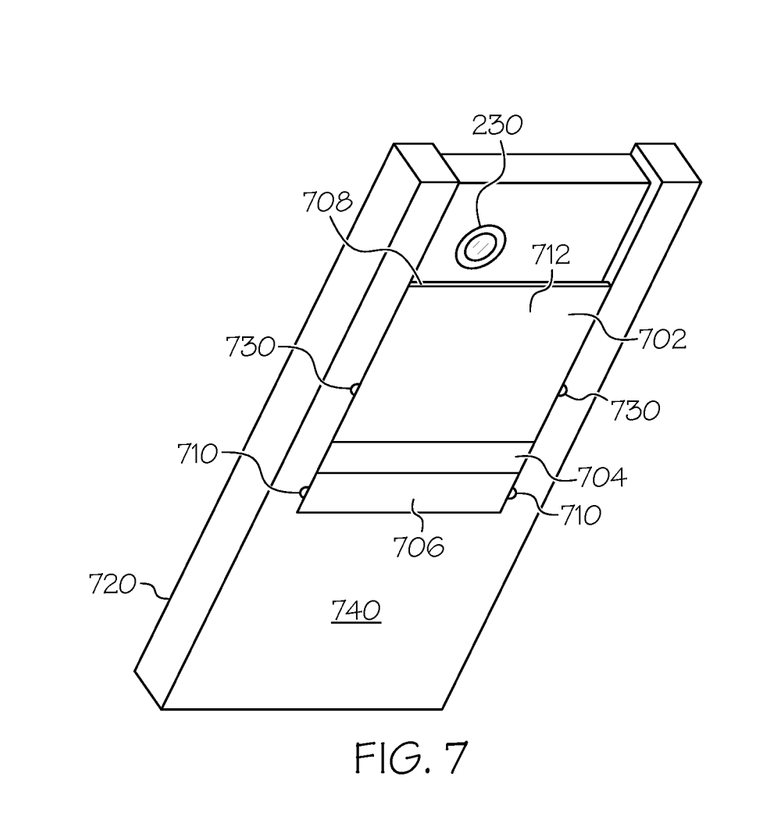
FIG. 7 illustrates a back view of an open hinged privacy cover device case, according to an example.

In an alternative example, the edges of the gap 126 at the end of the lip 122 have an extension of a track that allows part of the distal portion of the articulating panel 216 to move into the gap 126 and along the top front of the smartphone 102 to cover the front facing camera lens 108. In an example as is discussed above with regards to the front view of a first position articulating privacy cover device case 400, where the edges of the top opening 128 for a continuation of the track 224, the track is continued to the edges of the gap 126 in a similar manner. In this example, the case has a front side that extends over a portion of the front side of the smartphone when it is held into the case and that front side is connected to the case back side by the case top side. The articulating panel in this example moves along a track that includes a back side track that extends along the case back side, a top side track that extends along the case back side, and a front side track that extends along the case front side. The distal portion of the articulating panel moves into the second position by moving along the top side track and along the front side track so that the front side track holds a part of the distal portion in position to cover the front facing camera lens while exposing the user interface display FIG. 7 illustrates a back view of an open hinged privacy cover device case 700, according to an example. The back view of the open hinged privacy cover device case 700 depicts an alternative movable lens cover that is able to be utilized by a case 720 to provide the above described privacy features. In an example, the back view of the open hinged privacy cover device case 700 depicts the back of an example device case 720 that has a front similar to the front of the body 120 depicted in front view of an open privacy cover device case with a smartphone 100 discussed above. As is similar to the back view of the open articulating privacy cover device case 200, the back view of the open hinged privacy cover device case 700 depicts the back of an example device case 720 that is holding the smartphone 102. In order to more clearly describe relevant aspects of this example, the below description refers to the above description of the back view of the open articulating privacy cover device case 200 to describe the relevant features of the front side of the case.

The body 720 has a case back 740 that is adjacent to the back side of the smartphone 102 when the compartment is holding the smartphone 102. In this illustration, a back facing camera lens 230 is shown as being exposed through the case back 740 of the device case 720.

The back view of the open hinged privacy cover device case 700 shows a three portion movable lens cover 712 that has a proximal panel 702, a middle panel 704 and a far distal panel 706. In this example, the middle panel 704 and the far distal panel 706 form a distal portion that can be articulated to cover the front facing camera lens 108 while leaving the user interface display exposed. In the illustrated example, the far distal panel 706 is a single panel that is a far distal portion of the distal portion of the movable lens cover 712. In further examples, the far distal portion of the movable lens cover 712 is able to have any suitable structure.

The proximal panel 702 is connected to the case back 740 of the device case 720 by a proximal hinge 708. The proximal hinge 708 couples a first edge of the proximal panel 702 to the case back 740. In various examples, the proximal hinge 708 is able to be a hinge with a pin, the proximal hinge 708 is able to be a live hinge incorporating flexible or bendable material, any other type of hinge, or combinations of these. As is described in further detail below, the proximal hinge 708 allows the three portion movable lens cover 712 to be moved from an open position to a position where the proximal panel 702 covers the back facing camera lens 230.

The middle panel 704 has a first distal edge that depends from a second edge of the proximal panel 702, where the second edge is opposite the first edge of the proximal panel 702 that is coupled to the proximal hinge 708. Once the proximal panel 702 covers the back facing camera lens, which is referred to herein as being in a back cover closed position, the distal portion of the three portion movable lens cover 712 in an example can articulate between a distal portion open position and a distal portion closed position. In this example, the front facing camera lens 108 is exposed while the distal portion is in the distal portion open position. While the distal portion is in the distal portion closed position, the front facing camera lens 108 is covered while the user interface display 104 is exposed.

In the illustrated example, the three portion movable lens cover 712 is shown in the back cover open position. The illustrated back cover open position leaves the back facing camera lens 230 exposed. In the illustrated example, the three portion movable lens cover 712 is retained in the back cover open position by pins 710 and pins 730, which are yieldable members, that engage one or more features on the case back 740 of the device case 720. In an example, when the three portion movable lens cover 712 is in the open position, the proximal panel 702, the middle panel 704 and the distal panel 706 lie flat against the case back 740.

Figure 8:
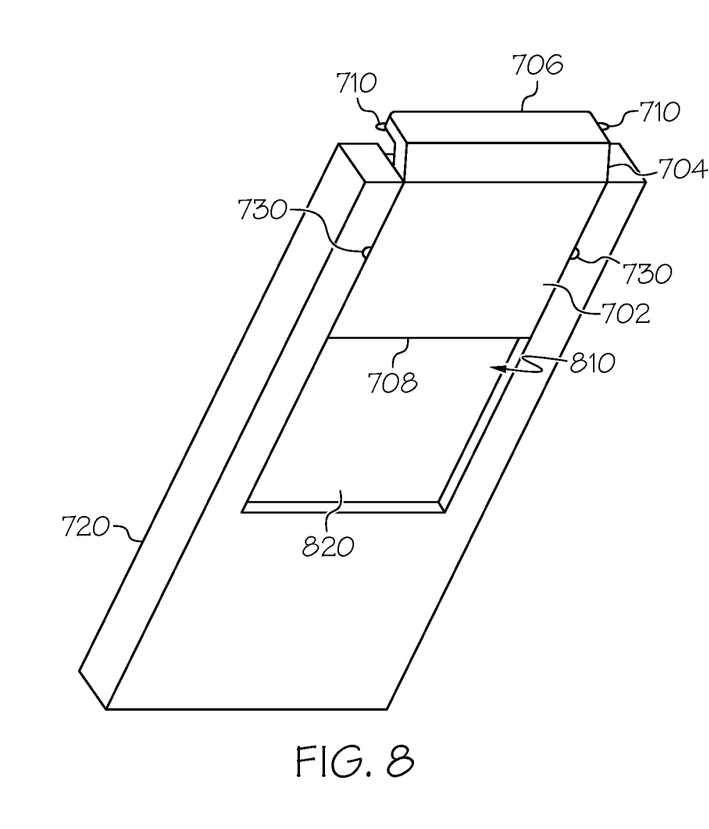
FIG. 8 illustrates a back view of a first position hinged privacy cover device case, according to an example.

FIG. 8 illustrates a back view of a first position hinged privacy cover device case 800, according to an example. In the first position hinged privacy cover device case 800, the proximal panel 702 has been moved to a back cover closed position that covers the back facing camera lens 230. The distal portion, which consists of the middle panel 704 and the far distal panel 706, is in an distal portion open position that leaves the front facing camera lens 108 exposed.

In the illustrated example, the proximal panel 702 of the three portion movable lens cover 712 is retained in the back cover closed position by pins 730, which are yieldable members, that engage one or more features on the case back 740 of the device case 720. In further examples, at least one of the proximal panel 702 and the case back 740 comprises magnets that retain the proximal panel in the back cover closed position. In further examples, any combination of yieldable members, magnets, or other retaining techniques are able to be used to retain the proximal panel 702 to the case back 740.

Once the three portion movable lens cover 712 is in the back cover closed position, the distal portion is able to be articulated from a distal portion open position, which leaves the front facing camera lens 108 exposed, to a distal portion closed position that covers the front facing camera lens while leaving the user interface display exposed. The first position hinged privacy cover device case 800 depicts the distal portion, which includes the middle panel 704 and the distal panel 706, in the distal portion open position wherein the front facing camera lens is not covered.

In an example, a user is able to use the electronic device, such as smartphone 102, while the three portion movable lens cover 712 is in the back cover closed position and the distal portion is in the distal portion open position. This allows the user, for example, to conduct a video call using the front facing camera lens 108 and the user interface display 104 because they are both exposed in this configuration. Although the front facing camera lens 108 is exposed in this configuration, the back facing camera lens 230 is covered and is protected from unintended use.

While the three portion movable lens cover 712 in this example is in the back cover closed position, the distal portion is able to be articulated from a distal portion open position to a distal portion closed position that covers the front facing camera lens while leaving the user interface display exposed. In an example, the front view of the case 720 when the three portion movable lens cover 712 is in the distal portion closed position is similar to that shown in the front view of a second position articulating privacy cover device case 600 described above. In the example of the camera case 720 with the three portion movable lens cover 712 in the distal portion closed position, the far distal panel 706 is similar to the third articulating panel 214 described above. In an example, the far distal panel 706 is retained in the second position that covers the front facing camera lens 108 by pins 710, which are yieldable members that engage one or more features on the front of the case 720. In further examples, the far distal panel 706 is retained in the second position by any suitable technique, such as by magnets, other techniques, or combinations of these.

Figure 9:
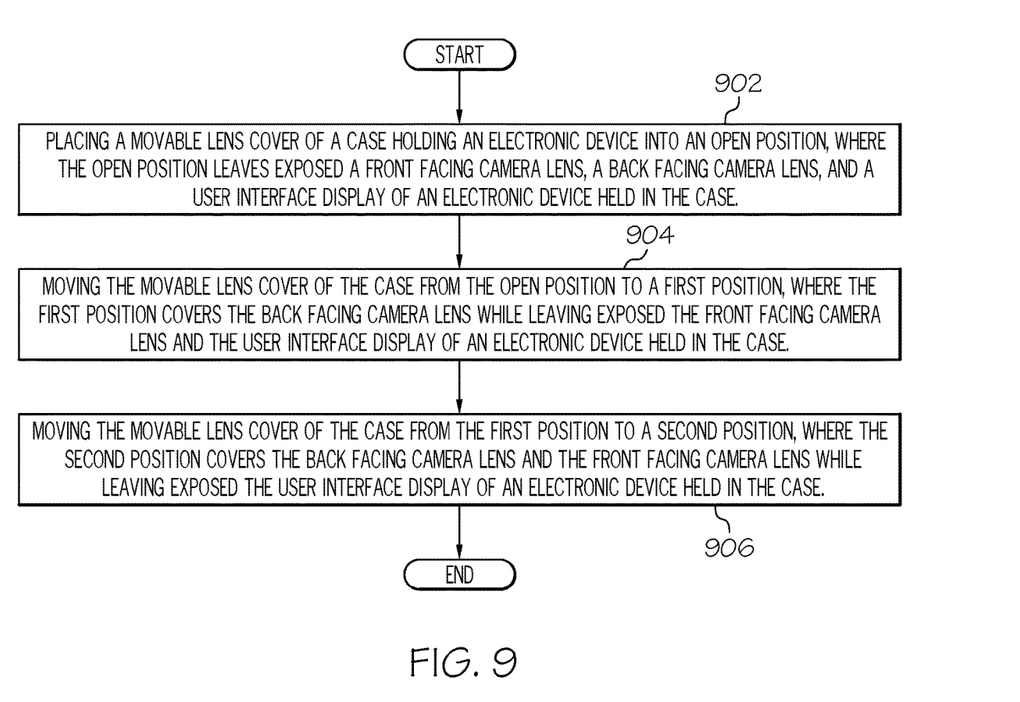
FIG. 9 illustrates a privacy enhancing device case operating process, according to an example.

FIG. 9 illustrates a privacy enhancing device case operating process 900, according to an example. The privacy enhancing device case operating process 900 is an example of a process that can be performed by using either the body 120 or the case 720, described above, that is holding an electronic device such as smartphone 102.

The privacy enhancing device case operating process 900 beings by placing, at 902, a movable lens cover of a case holding an electronic device into an open position, where the open position leaves exposed a front facing camera lens, an back facing camera lens, and a user interface display of an electronic device held in the case. Examples of the open position are illustrated in the back view of the open articulating privacy cover device case 200 and the back view of an open hinged privacy cover device case 700 described above.

The privacy enhancing device case operating process 900 continues by moving, at 904, the movable lens cover of the case from the open position to a first position, where the first position covers the back facing camera lens while leaving exposed the front facing camera lens and the user interface display of an electronic device held in the case. Examples of the first position are illustrated in the first position articulating privacy cover device case 300 and the back view of a first position hinged privacy cover device case 800 described above.

The privacy enhancing device case operating process 900 continues by moving, at 906, the movable lens cover of the case from the first position to a second position, where the second position covers the back facing camera lens and the front facing camera lens while leaving exposed the user interface display of an electronic device held in the case. An example of the second position is illustrated in the front view of a second position articulating privacy cover device case 600 described above.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A device case, comprising:
   a body configured to hold an electronic device, the electronic device comprising a device back side with a back facing camera lens and a front side with a user interface display and a front facing camera lens; and
   a movable lens cover comprising at least a proximal panel and a distal portion, the distal portion depending from the proximal panel, the proximal panel movably attached to the body, the movable lens cover movable into any of either one of:
      a back covering position wherein the back facing camera lens is covered while the user interface display and the front facing camera lens are exposed, or
      a front and back covering position wherein both the front facing camera lens and the back facing camera lens are covered while the user interface display is exposed,
   wherein the body cooperates with the movable lens cover to hold the movable lens cover in either the back covering position or the back and front covering position.

2. The device case of claim 1, the body comprising a case back side adjacent to the device back side when the body is holding the electronic device, and
   the movable lens cover being mounted to the case back side.

3. The device case of claim 2, further comprising:
   a proximal hinge joining the proximal panel to the case back side,
      the proximal panel having a first edge and a second edge opposite the first edge, the first edge being coupled to the case back by the proximal hinge,
      the proximal hinge allowing the proximal panel to move into a position covering the back facing camera when movable lens cover is moved into either the back covering position or the back and front covering position; and
      the distal portion having a first distal edge and a far distal edge, the distal portion depending at the first distal edge from the second edge and, when the proximal panel is in the back cover closed position, the distal portion articulating from a distal portion open position leaving the front facing camera lens exposed to a distal portion closed position covering the front facing camera lens while leaving the user interface display exposed.

4. The device case of claim 3, wherein the proximal hinge comprises one of a live hinge or a pin.

5. The device case of claim 3, wherein the case back side comprises yieldable members retaining the proximal panel in the back and front covering position.

6. The device case of claim 3, wherein at least one of the proximal panel and the case back side comprises magnets retain the proximal panel in the back and front covering position.

7. The device case of claim 2, wherein an articulating panel comprises the proximal panel and the distal portion,
   the articulating panel configured to slide into the back covering position, and
   the articulating panel configured to slide from the back covering position into the back and front covering position.

8. The device case of claim 7, wherein the case back side comprises a track, and
   the articulating panel sliding along the track.

9. The device case of claim 8, wherein the track holds the articulating panel, and
   wherein the case back side further comprises a track bottom extending beneath the track.

10. The device case of claim 8, wherein the track extends along the case back side,
    wherein the articulating panel slides from the back covering position to an intermediate position wherein the distal portion extends beyond the track and can be articulated to cover the front facing camera lens while exposing the user interface display.

11. The device case of claim 10, wherein the device case further comprises a case front side that extends over a portion of the front side of the electronic device when the electronic device is in held into the body, and
    wherein the case front side comprises yieldable members retaining the distal portion when the articulating panel is in the back and front covering position to cover the front facing camera lens while exposing the user interface display.

12. The device case of claim 10, wherein the device case further comprises a case front side that extends over a portion of the front side of the electronic device when the electronic device is in held into the body, and
    wherein at least one of the distal portion and the case front side comprises magnets retain the distal portion when the articulating panel is in the back and front covering position to cover the front facing camera lens while exposing the user interface display.

13. The device case of claim 8, wherein the device case further comprises:
    a case front side that extends over a portion of the front side of the electronic device when the electronic device is in held into the body; and
    a case top side connecting the case back side to the case front side,
    wherein the track comprises:
       back side track that extends along the case back side; and
       a top side track that extends along the case top side,
    wherein the articulating panel is further slides from the back covering position to an intermediate position by sliding along the top side track and extending beyond the top side track, and
    wherein a part of the distal portion is able to be articulated to cover the front facing camera lens while exposing the user interface display.

14. The device case of claim 8, wherein the device case further comprises:
    a case front side that extends over a portion of the front side of the electronic device when the electronic device is in held into the body; and
    a case top side connecting the case back side to the case front side,
    wherein the track comprises:
       back side track that extends along the case back side;
       a top side track that extends along the case back side; and
       a front side track that extends along the case front side, and
    wherein the articulating panel is further movable from the back covering position to an back and front covering position by sliding along the top side track and along the front side track into the back and front covering position, wherein the front side track, when the articulating panel is in the back and front covering position, holds a part of the distal portion in position to cover the front facing camera lens while exposing the user interface display.

15. A method for selectably covering one or more camera lenses of an electronic device, the method comprising:

moving, while an electronic device is within a case, a movable lens cover attached to the case into a back covering position, wherein electronic device comprises a device back side with a back facing camera lens and a front side with a user interface display and a front facing camera lens, the front facing camera lens located at a first position of the front side, and wherein:

the movable lens cover, when in the back covering position, covers the back facing camera while leaving the user interface display and the front facing camera lens exposed; and moving, subsequent to moving the movable lens cover into the back covering position, the movable lens cover from the back covering position to a front and back covering position that covers both the front facing camera lens and the back facing camera lens while leaving the user interface display exposed.

16. The method of claim 15, wherein moving the movable lens cover into the back covering position comprises operating a proximal hinge attaching the movable lens cover to a case back side of the case.

17. The method of claim 15, further comprising:

retaining, while the movable lens cover is in the back and front covering position, a portion of the movable lens cover into a position covering the front facing camera with one or more of magnets or yieldable members retaining the portion of the movable lens cover.

18. The method of claim 15, wherein the movable lens cover comprises an articulating panel, and wherein moving the movable lens cover comprises sliding the articulating panel along a track attached to the case.

* * * * *